(12) United States Patent
McTygue

(10) Patent No.: US 12,541,779 B2
(45) Date of Patent: Feb. 3, 2026

(54) BROWSER EXTENSIONS AND APPLICATIONS FOR CROSS-PLATFORM ITEM DATA IDENTIFICATIONS

(71) Applicant: PAYPAL, INC., San Jose, CA (US)

(72) Inventor: Anna McTygue, Omaha, NE (US)

(73) Assignee: PAYPAL, INC., San Jose, CA (US)

(*) Notice: Subject to any disclaimer, the term of this patent is extended or adjusted under 35 U.S.C. 154(b) by 581 days.

(21) Appl. No.: 17/893,064

(22) Filed: Aug. 22, 2022

(65) Prior Publication Data
US 2024/0062259 A1    Feb. 22, 2024

(51) Int. Cl.
*G06Q 30/00* (2023.01)
*G06Q 30/0601* (2023.01)

(52) U.S. Cl.
CPC .............................. *G06Q 30/0601* (2013.01)

(58) Field of Classification Search
CPC ........... G06Q 30/0601; G06Q 30/0603; G06Q 30/06031; G06Q 30/06032
USPC ..................................................... 705/26, 27
See application file for complete search history.

(56) References Cited

U.S. PATENT DOCUMENTS

| | | | | |
|---|---|---|---|---|
| 10,878,477 B2* | 12/2020 | Narasimhan | ....... | G06Q 30/0243 |
| 2009/0125411 A1* | 5/2009 | Otto | ....... | G06Q 30/04 |
| | | | | 705/34 |
| 2021/0192549 A1* | 6/2021 | Sinha | ....... | G06Q 30/0201 |
| 2023/0019454 A1* | 1/2023 | Jass | ....... | G06Q 30/0201 |
| 2024/0370915 A1* | 11/2024 | Ferguson | ....... | G06Q 30/0633 |

OTHER PUBLICATIONS

Ahmad Pouramini et al., Web Content Extraction Using Contextual Rules, Nov. 1, 2015, International Conference on Knowledge-Based Engineering and Innovation, Google search; 5pgs (Year: 2015).*

* cited by examiner

*Primary Examiner* — Robert M Pond
(74) *Attorney, Agent, or Firm* — Haynes and Boone, LLP (70481)

(57) ABSTRACT

There are provided systems and methods for browser extensions and applications for cross-platform item data identifications. A service provider server may provide website and application tools that may track user navigations, inputs and selections, and other operations with merchant websites and/or online merchant marketplaces. Further, the service provider may provide discounts and offers during purchases and transactions with the online merchants, which may further provide reward points or value based on use of the service provider's services. However, transactions may be canceled by the user and/or merchant, which may prevent distribution of such rewards. The service provider may provide operations to detect canceled transactions and thereafter determine the same or similar item from the transaction with different online merchants. The service provider may then automatically provide links and navigations to such items with the different online merchants using a browser extension and/or software application.

20 Claims, 5 Drawing Sheets

BROWSER EXTENSIONS AND APPLICATIONS FOR CROSS-PLATFORM ITEM DATA IDENTIFICATIONS

TECHNICAL FIELD

The present application generally relates to providing alternative website and navigation links for browsed data and more particularly to monitoring webpage navigations and/or browser sessions.

BACKGROUND

An online service provider may provide services to users that may be associated with online shopping and transaction processing. These services may include those associated with finding and providing discounts and other cost savings to be applied to transactions when generated on merchant websites. This may be performed through a web browser extension that monitors, scrapes, and/or extracts website data for merchant websites when a user is browsing the website and/or generating a transaction on the merchant website. For example, the web browser extension may monitor websites and data on websites, such as items added to a digital shopping cart and a total may be calculated based on items, shipping, tax, etc. However, browsing different websites and interfaces for available items and data requires manual efforts and users are required to review data and navigate to different merchant and other marketplace platforms. These automated computing tools require specific knowledge of the webpage(s), layouts of the webpage(s) and navigation to such online platforms and data in order to properly scrape, identify, and/or extract data and provide corresponding benefits when at checkout and/or processing transactions. Without identifying the same or similar items with different platforms, service provider browser extensions and/or add-ons may not be able to properly provide information to users. Thus, online service providers may require improved and more efficient coded scripts for identification and matching of available and/or posted data between different websites and merchant marketplaces.

Figure 1:
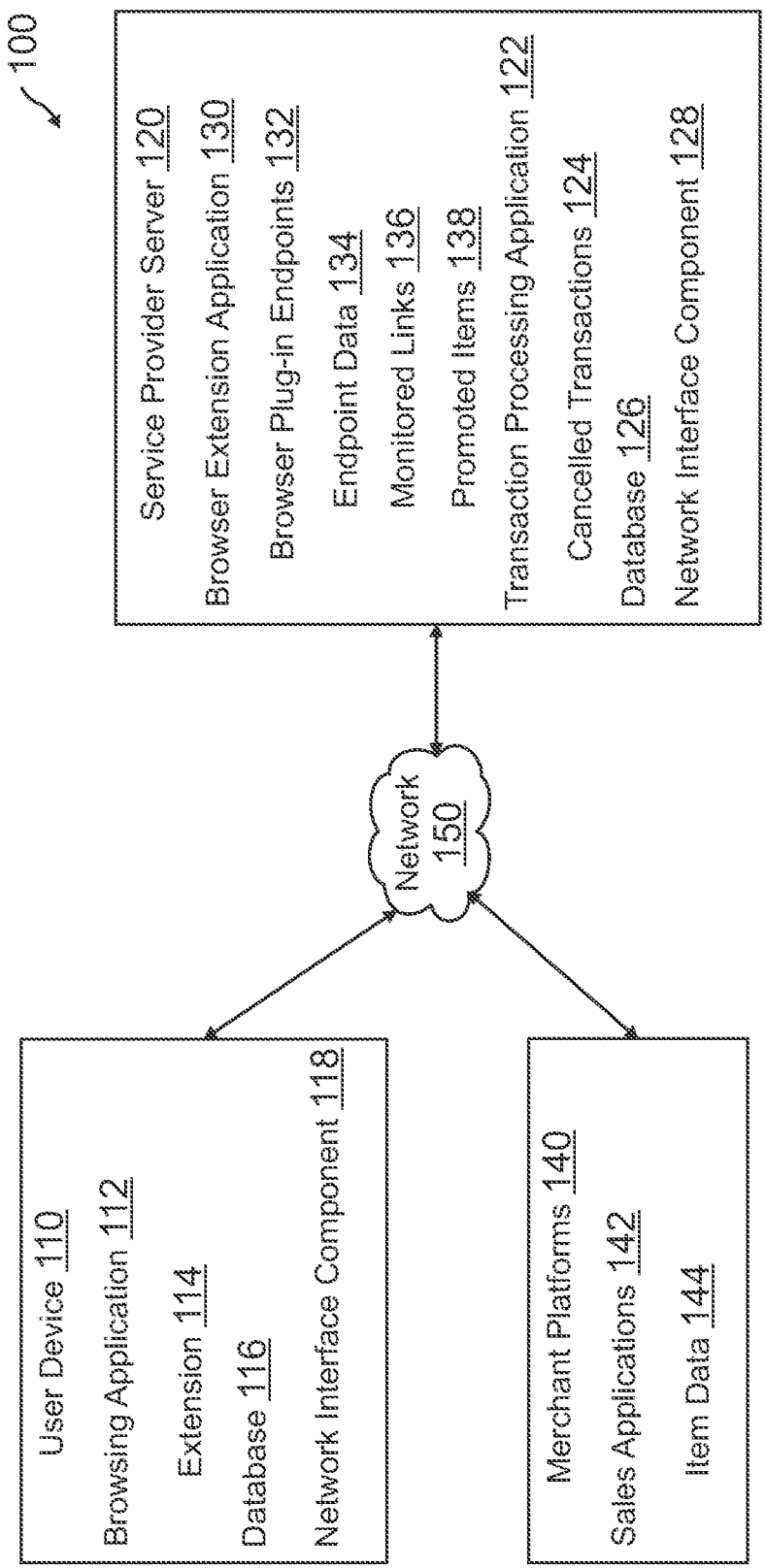
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for browser extensions and applications for cross-platform item data identifications, such as data for items, objects, or services on webpages, for use in data comparisons and outputs on computing devices. Systems suitable for practicing methods of the present disclosure are also provided.

A service provider, such as HONEY®, may provide services associated with discounts, benefits, loyalty, and other cost savings when checking out and paying for transactions electronically on merchant websites. To provide these services, the service provider may provide a browser tool, add-on, extension, or the like, as well as a resident dedicated application (e.g., mobile application), that may monitor webpage elements on webpages of a merchant website for a merchant. This may allow the service provider to identify items, provide cross-selling and/or comparison shopping, determine and/or enter coupons and other savings, and provide other services to users on computing devices. Other service providers may also provide different services through monitoring and identifying data on websites visited by users, as well as monitoring and tracking navigations during browser and/or shopping sessions, which may provide different benefits and utilities to users. However, with the vast array of different website constructions and webpage layouts, data presentations, and the like, service providers may encounter difficulties in correlating and matching items that may be available between different platforms. This may be specifically relevant when a transaction for an item is canceled on one merchant website or another online platform, and the user may wish to identify the item with another online merchant.

In this regard, the operations of the browser or other application extension and/or application may monitor users' navigations and/or inputs when browsing different merchant or other entity websites. These navigations and user inputs may correspond to browsing and/or transaction sessions during online user shopping and/or electronic transaction processing sessions. During these sessions, a transaction may have been initiated (e.g., by viewing an item and/or adding the item for purchase in a digital shopping cart), partially completed and then abandoned (e.g., ending and/or abandoning after initial input of user and/or financial information), and/or completed. For example, certain transactions or a portion of the transaction may be ended after selecting items for purchase, may be canceled by a merchant after ordering and/or request, and/or may be nullified or abandoned by the user or merchant due to a lack of inventory, cost, benefit or discount accrual or provision, or the like. This may be particularly important or common with high demand items, where merchants may run out of inventory prior to a user completing a checkout. However, other merchants and/or branches of the merchant may have remaining inventory and users may be interested in purchasing from remaining inventory. One or more operations, programs, scripts, or applications may be implemented to identify these canceled, abandoned, declined, nullified, or otherwise ended transactions and corresponding navigation links and items in the transaction, as well as the selected features of the items (e.g., color, size, quantity, or other options).

Thereafter, these operations may be used to query, search, and/or scrape other external merchant platforms, websites, and/or online digital inventories for the same matching item, or a similar item, such as based on an item identifier, description, stock keeping unit (SKU), or another item and/or inventory identifier. Once the item is identified with one or more other merchants, the online service may provide, via the browser extension, plug-in, and/or software application, links to corresponding data. The service provider may then load item data and selected features, as well as facilitate, through such operations, the navigation to and processing of a transaction with the initial or other merchant platforms for the item. Thus, corresponding data may be extracted and processed to provide a service of the service provider, browser extension, and/or application to the user via the computing device.

For example, a user may wish to process a purchase of one or more items in a transaction. Selection of one or more items during an online transaction with a merchant website may require a payment instrument from the user for electronic transaction processing. A user may pay for one or more transactions using a digital wallet or other account with an online service provider or transaction processor (e.g., PAYPAL®, VENMO®, or other affiliates and/or service providers, such as banks, financial institutions, credit card providers, HONEY® or other discount providers, and the like). Further, payment may be provided by proffering a payment card or other financial instrument (e.g., through providing the physical card and reading card data or by entering card details and/or account numbers). An account and/or corresponding payment card for payments by a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

For the account, the user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). The account creation may also be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and the other transaction processing services.

For example, a service provider may establish coded data packages and operations that identify various fields, forms, data entry or input boxes, and the like on webpages and/or within web or device applications. These may be based on webpage heuristics, such as quick identifications of particular data and/or webpage elements through certain terms, weights, and/or webpage element attributes. For example, data for a term may correspond to a term to identify on the different webpages, such as "product", "total", "price", "description", as well as combinations of terms and/or sequences, such as "add-to-cart" and the like. Other terms may also be used for different websites and/or application interfaces. Further, weights to terms and webpage element attributes may be identified and used to determine data on different webpages or presentable through different applications, such as a HyperText Markup Language (HTML) attribute that is used for searching and present data. For example, with HTML elements, the elements may have an attribute, type, or tag including "id" (e.g., a unique identifier), "class" (e.g., for classifying elements), "style", "title", and the like.

On merchant webpages and the like, there may be fields for a final price, a question for "Is the product sold out?", add an item to digital shopping cart, navigate to a cart page, and the like. In this regard, a service provider, such as, HONEY®, may provide a corresponding operation usable with a computing device that may implement the data packages client-side, locally on a mobile or other computing device, and/or remotely, to monitor, scan, and record data of user interactions and navigations on webpages and/or to webpage links and/or specific application interfaces that may be associated with different merchants. The operation(s), extension(s), and/or application(s) may detect a navigation to a webpage of a web site, such as through entry and/or navigation to a specific URL or URI and/or selection of interface and/or webpage links for merchant webpages. Thereafter, the script may be executed to monitor, extract, and/or process webpage elements from the HTML or extensible markup language (XML) code on the merchant website and/or checkout process. For example, webpage elements may include HTML code for listings, links, presented data, images, descriptions, fields, menus, and the like. The data may be extracted from page data for the webpage and processed by the extension or application. The extension, application, plug-in, or the like may locate the corresponding feature, data, and/or element across multiple webpages through identification of terms and weighting of those terms, which may be independent of requirement of identification of where the feature, data, or element may occur on the webpage or in the webpage code.

Using these webpage and interface elements, navigations, browsing data and sessions, and user selections determined from the webpage's document code and/or data, the extension or application may monitor, track, and record user interactions with different webpages and/or application interfaces. For example, the elements may correspond to fields, data, and the like for item or product information and images, item identifiers, digital shopping cart information and/or access, shipping information, billing information, a total, a coupon field, available coupons and coupon information, and the like. These may be parsed and/or processed for the elements for the corresponding items and/or transactions that a user may engage and/or request processing. Once the proper feature, data, or element is identified, data for that feature or other webpage property may be determined and/or extracted in order to monitor user browsing and shopping sessions. For example, for a feature corresponding to an item advertisement or available item for purchase, item information may be extracted, such as a description, a price, an image, a name or identifier, and/or other data. The data may be provided to the extension and/or application for processing and identification/comparison to the same or similar data with another website or merchant marketplace of a different merchant or may be provided to the service provider for data processing and/or data comparisons and correlations. This may allow the user to view comparisons between different websites and data available on those websites, such as comparison between different items, prices of those items, and the like. This may allow for users to perform electronic transaction processing based on comparison shopping.

Once the account of the user is established with the service provider and usage of the application and/or browser add-on, extension, or plug-in has been established, the user may utilize the account via such computing operations on one or more computing devices, such as a personal computer, tablet computer, mobile smart phone, or the like. The user may engage in one or more online or virtual interactions, such as browsing websites and data available with websites of merchants, which may result in navigational data including links and/or interactions that correspond to fetching data from remote servers, systems, and devices. The transaction processor may monitor and/or track the data over a plurality of visited websites, online resources, and/or applications, for example, using the application and/or application plugin, application extension, or application add-on. Such extensions and/or applications may be provided by a digital platform associated with the service provider and/or transaction processor (e.g., HONEY® or another browser add-on). The service provider may detect engagement in a transaction, such as by viewing one or more items for purchase, adding items to purchase into a digital shopping cart, engaging in a purchase and/or shopping cart checkout, and/or completing a transaction where an item is requested for purchase. However, such transaction may be canceled by the user and/or the merchant. For example, the user may abandon the transaction prior to completion and payment, or the merchant may cancel the transaction after payment due to lack of inventory, shipping unavailability, or other merchant error or lack of item/service. If the service provider distributes rewards, benefits, or the like for completing of the transaction, the user may not realize and obtain such rewards if the transaction is ended.

After detection and/or identification of the canceled, abandoned, or otherwise ended transaction, the service provider may utilize the data monitored using the application and/or application extension to identify the navigational actions, interactions, links, and the like performed by the user when browsing the item(s) and/or processing the canceled transaction. The service provider may utilize such data to extract item data from the merchant and/or merchant marketplace used during the transaction. Utilizing this data, one or more machine learning or rules-based algorithms, models, and/or engines may be utilized in order to identify the same (or similar) matching item with another merchant. This may be performed using an SKU, item identifier, or other code utilized to specifically identify the same or similar structural or matching item, such as the same clothing item from the same manufacturer or a similar item that may be considered the same when purchasing the item (e.g., the same dress or other clothing article). The service provider may also extract from the link and/or transaction, the features of the item, such as the size, color, amount, quantity, quality, or other corresponding feature or parameter of such item. When locating the matching item with one or more other merchants, online marketplaces, merchant web sites, or the like, the service provider may query and identify whether the user selected features are available and may be selected with such service providers. For example, the service provider may ensure that the same blue dress in a particular size is also available with such service providers. However, a price for the item may be flexible between the different merchants and/or marketplaces, as well as any available discounts or savings may be applied differently when purchasing the matching item with other merchants.

Once the item is located with another merchant, navigation links and/or redirection or rerouting operations may be provided to the user to direct the user to the item that is available on another digital platform or marketplace. This may be provided at the time of the transaction, the transaction's cancelation or abandonment, and/or at a later time when the user engages in another shopping session or utilizes the service provider's application and/or browser plug-in. A direct link to the item may be made available so that selection of such a link or prompt may automatically load and/or direct the user to the same or matching item. Further, the extracted item preferences, features, and/or parameters may be automatically loaded from the previous transaction so that the user may purchase the same or similar matching item without being required to remember and/or provide user selections. This may allow the user to quickly and efficiently engage in additional online interactions with other merchants and/or online marketplaces without unnecessary user inputs, navigations, and/or user interactions. Further, the service provider may provide rewards or benefits from completing electronic transactions, which may be accrued by the user's account. By allowing the user to complete the transaction with another merchant, the user may realize and accrue such rewards, such as digital "gold," "reward points," or the like.

In the manner, the service provider may provide browser or other application extensions and/or dedicated software applications that may be capable of identifying and extracting data across websites and other online platforms for merchants and other entities. This allows for automated identification of items and item features in order to provide fallback computing services for electronic transaction processing for the same or similar items with different merchants and/or on different merchant platforms. Further, when transactions are canceled with certain merchants and/or by users, the transaction's data may be stored and utilized to provide alternatives with other merchants and/or on other digital marketplaces. This may allow the user to obtain the benefits of use of such a service provider's application and/or application extension or plug-in when the user and/or merchant may have previously ended a transaction, which leads to more efficient and coordinated application and digital platform usage.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110, a service provider server 120, and merchant platforms 140 in communication over a network 150. User device 110 may be used to browse websites and/or merchant marketplaces via software applications using a platform, application, and/or application extension provided by service provider server 120. During use of user device 110 with merchant platforms 140, user device 110 and/or service provider server 120 may detect when a webpage or other online data is visited that may correspond to a page for interaction by the extension or application (e.g., an item browsing page, a checkout page and/or flow, etc.). Navigation and item transactions may be tracked. If service provider server 120 detects a cancelation of a transaction for an item, service provider server 120 may provide links to similar or matching items with the merchant and/or other merchants available with merchant platforms 140.

User device 110, service provider server 120, and merchant platforms 140 may each include or be associated with one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with service provider server 120, merchant platforms 140, and/or another device or server for browsing websites and identifying website features, data, and/or elements. User device 110 may correspond to or be associated with an individual user, consumer, or merchant that utilizes user device 110. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains a browsing application 112, a database 116, and a network interface component 118. Browsing application 112 may correspond to executable processes, procedures, and/or applications with associated hardware. In other embodiments, user device 110 may include additional or different software as required.

Browsing application 112 may correspond to one or more processes to execute modules and associated devices of user device 110 to provide a convenient interface to permit a user for user device 110 to access and browse merchant platforms 140 and/or engage in electronic transaction processing with merchant platforms 140. In this regard, browsing application 112 may correspond to specialized hardware and/or software utilized by user device 110 that may provide for website and item browsing from merchant platforms 140, as well as transaction processing for the items. Viewing, browsing, and interacting with merchant platforms 140 may be done through one or more user interfaces of browsing application 112 enabling the user to access merchant platforms 140 and enter and/or view the items that the user associated with user device 110 wishes to purchase. This may be based on a transaction generated by browsing application 112 using a merchant website provided by merchant platforms 140. Browsing application 112 may also be used by a user to provide payments and transfers to a second user or merchant. For example, browsing application 112 may utilize user financial information, such as credit card data, bank account data, or other funding source data, as a payment instrument when providing payment information. Additionally, browsing application 112 may utilize a digital wallet associated with an account with service provider server 120 as the payment instrument, for example, through accessing a digital wallet or account of a user through entry of authentication credentials and/or by providing a data token that allows for processing using the account. Browsing application 112 may also be used to receive a receipt or other information based on transaction processing.

In various embodiments, browsing application 112 may correspond to a web browser application and/or web browser extension (with a general web browser application) configured to retrieve, present, and communicate information over the Internet (e.g., utilize resources on the World Wide Web) or a private network. For example, browsing application 112 may provide a web browser and/or extension, which may send and receive information over network 150, including retrieving website information, presenting the website information to the user, and/or communicating information to the website, including payment information for the transaction. Browsing application 112 may correspond to a mobile web browser application. In this regard, browsing application 112 may include an extension 114 corresponding to a browser extension, add-on, or plug-in that may be provided by service provider server 120, such as one provided by HONEY®. However, in other embodiments, browsing application 112 may include a dedicated application of service provider server 120 or other entity (e.g., a merchant), which may be configured to provide the services discussed herein with merchant platforms 140. Browsing application 112 may include extension 114 having operations to parse, monitor, and track data on a merchant website in order to determine whether one or more discounts, rebates, coupons, or savings are available with the merchant website or item, and/or provide other services for items on the merchant website. Further, browsing application 112 may be used to add or insert savings to a transaction, for example, by entering a savings alphanumeric code, bar or QR code, text, data, or the like to a webpage field and/or option that causes the savings to be applied to and reduce a cost of a transaction.

In this regard, extension 114 of browsing application 112 may be used to monitor website navigations and/or electronic transaction processing on websites. Extension 114 may monitor and track HTML or XML code for one or more webpages of merchant platforms 140, as well as other interface data and the like for item data and/or electronic transaction processing. Extension 114 may be used for identification of webpage features, data on webpages, and/or individual or groups of webpage elements when parsing and/or processing the HTML elements or code and the like for the monitored, tracked, and/or recorded navigations and electronic transaction processing. Service provider server 120 may receive the data from extension 114 and may utilize the data for determining matching items with other merchants in order to facilitate additional transaction processing when a cancelation of a transaction has occurred.

User device 110 may further include database 116, which may include, for example, identifiers such as operating system registry entries, cookies associated with browsing application 112 and/or other applications, identifiers associated with hardware of user device 110, or other appropriate identifiers. Identifiers in the database may be used by a payment/service provider to associate user device 110 with a particular account maintained by the payment/service provider. The database may also further store monitored navigation and/or electronic transaction processing data.

User device 110 includes at least one network interface component 118 adapted to communicate with service provider server 120, merchant platforms 140, and/or another device or server over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide operations for monitoring website browsing and providing services and data to users on webpages and/or for item transaction processing. Various embodiments of the navigation processing system described herein may be provided by service provider server 120 and may be accessible by user device 110 when accessing one or more of merchant platforms 140. In such embodiments, service provider server 120 may interface with user device 110 for additional item suggestions based on transactions or portions of a transaction that are canceled, nullified, or otherwise not completed by a user or merchant. Service provider server 120 includes one or more processing applications which may be configured to interact with user device 110 and merchant platforms 140. In one example, service provider server 120 may be provided by PAYPAL® and/or HONEY®. However, in other embodiments, service provider server 120 may be maintained by or include another type of service provider.

Service provider server 120 of FIG. 1 includes a browser extension application 130, transaction processing application 122, a database 126, and a network interface component 128. Browser extension application 130 and transaction processing application 122 may correspond to executable processes, procedures, and/or applications with associated hardware. In other embodiments, service provider server 120 may include additional or different modules having specialized hardware and/or software as required.

Browser extension application 130 may correspond to one or more processes to execute modules and associated specialized hardware of service provider server 120 to monitor and track user navigations and transaction processing to provide services where transaction may be canceled with online merchants. In this regard, browser extension application 130 may correspond to specialized hardware and/or software used by a user associated with user device 110 to establish browser plug-in endpoints 132, which may correspond to endpoints for one or more mobile or other computing devices that include installed applications, browser extensions, plug-ins, or the like that may provide navigation data to service provider server 120. For example, browser plug-in endpoints 132 for browser extension application 130 may allow for systematic determination of webpage and/or interface features, data, and/or elements that may be associated with electronic transaction processing. This may be based on webpage, application, and/or interface code, such as elements, descriptions, and other data for items, digital shopping carts, and/or electronic transactions. For example, an HTML document for a webpage may include webpage elements, where the HTML code for the document may be extracted and parsed by computing devices. This allows for determination of webpage features, data, or one or more specific elements to determine if a page contains certain item data, which may be identified, extracted, and used with transaction processing application 122 when one or more transactions may be canceled.

During monitoring of browser plug-in endpoints 132 by browser extension application 130, endpoint data 134 may be received. This may include monitored links 136 that may be used to provide promoted (or similar/same) items 138 to different computing devices, such as user device 110 based on detection of a canceled transaction 124 by transaction processing application 122. In this regard, when a user browses items, engages in electronic transaction processing, and/or results in canceled transactions 124, endpoint data 134 may be processed to determine monitored links 136. Endpoint data 134 may therefore be used to determine an item name, item identifier, a title or description of an item advertisement or sale, a type of webpage or other page detection, savings available or applied on webpages, applied coupons on webpages, and other features and operations associated with different webpages and/or marketplace platforms and interfaces of merchant platforms 140. This may result in monitored links 136, which may be associated with canceled transactions 124. Thus, when one of canceled transactions 124 is detected, a corresponding one or more of monitored links 136 may be determined in order to identify, determine, and/or extract item data in order to provide promoted items 138

For example, after a transaction is canceled or otherwise ended and detected as one of canceled transaction 124, corresponding rewards, points, real or virtual currency, or the like may be either revoked or not provided by service provider server 120 to the user and/or account corresponding to user device 110. This may provide an inadequate and/or poor customer experience, where service provider server 120 may want to provide alternatives with other merchants and/or promote the same or similar item with other merchants. This may include merchants that are signed up for and/or engage in a preferred merchant program for item promotions. In contrast to conventional solutions that may merely notify the user the transaction is canceled and prompt the user of whether transaction processing is available, the solutions provided herein may utilize data monitored via user device 110 to determine if the same or similar product is available with other merchants and/or via electronic transaction processing.

Thus, when one of canceled transactions 124 is detected from electronic transaction processing by transaction processing application 122, monitored links 136 may be used to determine past links to the item, as well as extract and determine item data and feature data for features of the item selected by the user. Thereafter, promoted items 138 may be determined, which may correspond to one or more links to the same or similar item with the same or a different merchant. Promoted items 138 may then be output to the user corresponding to user device 110 via extension 114 through one or more browsing and/or application usage session. Promoted items 138 may also include links and/or data to automatically or on selection navigate to an online merchant and their corresponding website and/or marketplace platform, as well as load the item's particular webpage and/or data and select the features previously requested and/or entered by the user.

Transaction processing application 122 may correspond to one or more processes to execute modules and associated specialized hardware of service provider server 120 to process a transaction or provide another service to customers, merchants, and/or other end users and entities of service provider server 120. In some embodiments, transaction processing application 122 may be used by a user associated with user device 110 to establish a user and/or payment account, as well as a digital wallet, which may be used to process transactions. For example, an account provided by HONEY® may be provided for item comparison, discount services, and/or canceled transaction suggestions. However, a more general account (e.g., a PAYPAL® account) may also provide the account services and be utilized for transaction processing application 122. In various embodiments, financial information may be stored with the account, such as account/card numbers and information that may enable payments, transfers, withdrawals, and/or deposits of funds. A digital token for the account/wallet may be used to send and process payments, for example, through an interface provided by service provider server 120. The account may also be used to receive and/or utilize rewards, loyalty points, coupons, incentives, discounts, and the like with one or more of merchant platforms 140.

In this regard, browser extension application 130 and/or transaction processing application 122 may provide savings and coupon services via browsing application 112, for example, by providing item comparison shopping, coupons and savings, and the like while browsing and/or purchasing items on merchant platforms 140. Extension 114 of browsing application 112 (e.g., generated and/or provided by browser extension application 130) may be used when identifying, determining, and/or extracting features, data, and/or elements on multiple webpages in order to determine applicable coupons, discounts, or the like, which may be utilized for the savings and coupon services during electronic transaction processing. The account may be accessed and/or used through a web browser application/extension and/or dedicated software application executed by user device 110 and engage in computing services provided by transaction processing application 122. Transaction processing application 122 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Transaction processing application 122 may include one or more APIs that perform API calls and requests, and receive responses, to provide services for canceled transaction suggestions and discount or savings services. This may include providing API calls that interact with user device 110 to provide additional information regarding canceled transactions 124 that may allow for cross-platform and/or merchant transaction processing.

In various embodiments, transaction processing application 122 may be used when navigating to and/or between webpages, applications and/or application interfaces, computing services, digital resources, and the like for electronic transaction processing, which may be monitored by browser extension application 130 using extension 114. For example, transaction processing application 122 may be used with accessed webpages to provide one or more services. Thus, transaction processing application 122 may provide services associated with websites and webpages via browsing application 112, which may correspond to one or more merchant platforms 140 and associated resources to provide features, services, and other operations for a user, purchaser, merchant, seller, or the like. In this regard, the webpages and/or online digital platforms of various merchant platforms 140 may be utilized by one or more merchants to provide transaction processing and sales. For example, transaction processing application 122 and/or browser extension application 130 may interface with user device 110 while browsing the webpages of merchant platforms 140 and provide discount and savings services via browsing application 112.

Transaction processing application 122 may further be utilized by customers and other end users to view one or more user interfaces (UIs), for example, via graphical UIs (GUIs) presented using an output display device of user device 110. These UIs may be used with browsing application 112 and/or merchant platforms 140 to navigate through items for sale on the merchant website, generate a transaction, receive savings and other discounts or coupons, and checkout for the transaction on the merchant website, as well as provide additional links and/or data for canceled transaction suggestions when one or more of canceled transaction 124 are detected. Transaction processing application 122 may process the payment and may provide a transaction history to user device 110 for transaction authorization, approval, or denial. In other embodiments, transaction processing application 122 may further provide different computing services, including social networking, microblogging, media sharing, messaging, business and consumer platforms, etc.

Transaction processing application 122 may provide additional features to service provider server 120. For example, transaction processing application 122 may include security applications for implementing server-side security features, programmatic client applications for interfacing with appropriate application programming interfaces (APIs) over network 150, or other types of applications. Transaction processing application 122 may contain software programs, executable by a processor, including one or more GUIs and the like, configured to provide an interface to the user when accessing service provider server 120, where the user or other users may interact with the GUI to view and communicate information more easily. In various embodiments, transaction processing application 122 may include additional connection and/or communication applications, which may be utilized to communicate information to over network 150.

Additionally, service provider server 120 includes database 126. Database 126 may store various identifiers associated with user device 110. Database 126 may also store account data, including payment instruments and authentication credentials, as well as transaction processing histories and data for processed transactions. Database 126 may store endpoint data 134 and other extracted data, such as monitored links 136. Further, data associated with providing transaction processing services, such as those associated with canceled transactions 124 processed via transaction processing application 122, may be stored by database 126.

In various embodiments, service provider server 120 includes at least one network interface component 128 adapted to communicate with user device 110, merchant platforms 140, and/or another device/server for a merchant over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Merchant platforms 140 may correspond to one or more online websites, digital marketplace platforms, web applications, application stores for local device software application, and associated resources to provide features, services, and other operations for a merchant, seller, or the like to advertise, market, sell, and/or provide items for sale, as well as provide checkout and payment. In this regard, merchant platforms 140 may be utilized by one or more merchants to provide websites and/or online portals for transaction processing and sales. For example, merchant platforms 140 may be used to host a website having one or more webpages that may be used by customers to browse items for sale and generate a transaction for one or more items. Merchant platforms 140 may provide a checkout process, which may be utilized to pay for a transaction. In some embodiments, the checkout process may be provided by service provider server 120 based on one or more operations, software development kits (SDKs), application programming interface (API) standards or guidelines, and the like that may be implemented in the merchant website. The checkout process may be used to pay for a transaction using a payment instrument, including a credit/debit card, and account with service provider server 120, or the like.

Merchant platforms 140 may be utilized by customers and other end users to view one or more user interfaces, for example, via graphical user interfaces (GUIs) presented using an output display device of user device 110. These user interfaces may be used to navigate through items for sale on the merchant website, generate a transaction, and checkout for the transaction on the merchant website. Further, merchant platforms 140 may be processed and/or parsed to scrape and/or extract data (e.g., HTML/XML code and/or elements from CSS/HTML/XML documents for webpages) when viewing items, engaging in electronic transaction processing, or otherwise interacting with merchant platforms 140. Thus, user device 110 may identify different features of webpages, interfaces, and/or online merchant marketplaces for merchant platforms 140, such as when browsing items and engaging in transaction processing in browsing application 112 on user device 110.

Merchant platforms 140 may provide features, services, and other operations for sales and checkout purchases through sales applications 142. In this regard, sales applications 142 may be utilized to provide websites and/or online portals for transaction processing and sales. For example, merchant platforms 140 may host a website having one or more webpages that may be used to browse items for sale and generate a transaction for one or more items. Sales applications 142 may then provide a checkout process, which may be utilized to pay for a transaction. The checkout process may be used to pay for a transaction using a payment instrument, including a credit/debit card, and account with service provider server 120, or the like. Merchant platforms 140 may be utilized by a user and/or merchant to view one or more user interfaces (UIs), for example, via graphical UIs (GUIs) presented using an output display device of user device 110. Thus, these UIs may be used to navigate through items for sale on the merchant website, generate a transaction, and checkout for the transaction on the merchant website.

In order to provide data and features for merchant platforms 140, external webpages, marketplace platforms, and/or other online merchant data for item sales, sales applications 142 may include item data 144 corresponding to HTML or XML code, code snippets, database records and/or information, and the like for different webpages and/or online merchant marketplaces. These item data 144 within one or more webpages and/or on one or more online merchant marketplaces provide the operations, input fields, menus, browsable data, and the like to view and/or search for items, browse items, add items to digital shopping carts, and/or complete a checkout. For example, item data 144 may correspond to data for items, coupons or savings, shipping, billing, name, account identifier, item total, sales tax, tip, shipping costs, and the like. In other embodiments, item data 144 may provide different data and features. User device 110 may parse item data and may engage in electronic transaction processing. Further, service provider server 120 may utilize item data to find matching and/or corresponding items and item features in order to provide suggestions in response to canceled or ended transactions, such as availability with other online merchants corresponding to merchant platforms 140.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
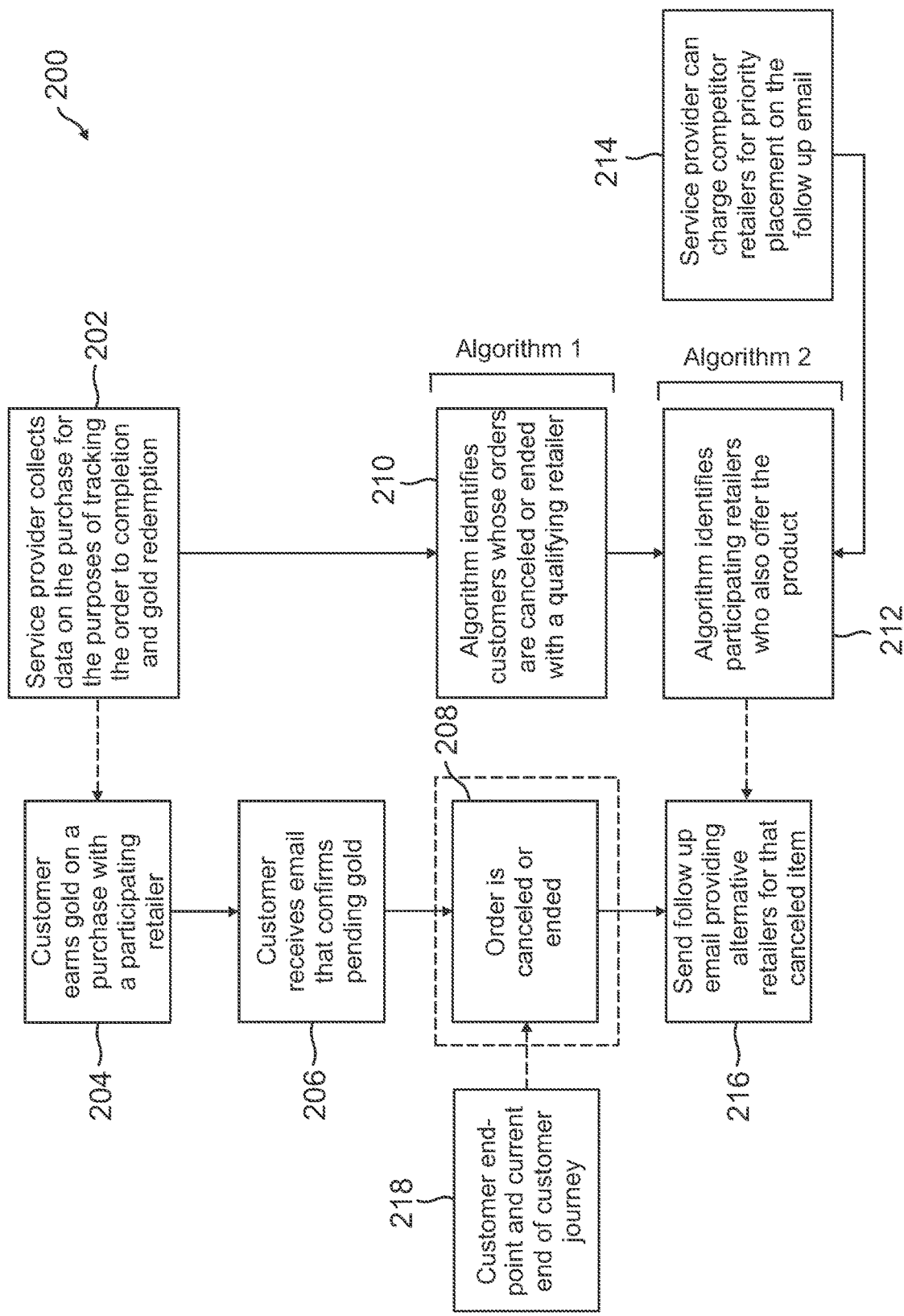
FIG. 2 is an exemplary diagram of a flow for providing matching items available on different online merchant marketplaces in response to a canceled order, according to an embodiment.

FIG. 2 is an exemplary diagram 200 of a flow for providing matching items available on different online merchant marketplaces in response to a canceled order, according to an embodiment. FIG. 2 includes a flow of operations that may be performed by a service provider server and/or application/application plug-in on a computing device, such as service provider server 120 and/or extension 114, respectively, in system 100 of FIG. 1. This may include provision of available transaction processing from multiple merchants, such as two or more merchants and/or merchant platforms that may separately provide items from a single transaction having multiple items (e.g., a pair of shoes from one merchant and dress from a second merchant, where the shoes and dress may have been originally incorporated in a single transaction).

In diagram 200, initially at box 202, a service provider, such as one associated with service provider server 120, may collect data for a purchase by a customer, which is collected for the purposes of tracking the order to completion and for "gold" or other reward bonuses and/or currency distribution and redemption. The rewards may also be collected or based on browsing and other electronic transaction processing activities with the service provider. This may be performed in response to monitoring and detecting electronic transaction processing engagements and requests via a computing device based on a software application and/or browser application extension, plug-in, or add-on that may be installed on such computing device. Based on this transaction, initial engagement in the transaction (e.g., adding items to a digital shopping cart, attempting a checkout that may be abandoned, canceled, or nullified, etc.), and/or browsing items for purchase, the customer may earn the gold or other reward points or value if the purchase is completed with a corresponding participating retailer at box 204. This may be a value based on processing the transaction electronically with the service provider and/or use of the service provider to add or provide discounts and/or benefits to processing the transaction. At box 206, the customer may then receive an email or other electronic communication, including interface alerts, that confirms the purchase and the provision of the corresponding gold or other value or reward.

At box 208, the retailer for the transaction and purchase cancels the order. This may occur when the retailer or other merchant lacks inventory, cannot process the order, is refused from processing the order, may fail a risk or fraud check with the user, is unable to process financial, shipping, or billing information, or otherwise requires or selects to end the transaction. In some embodiments, this may occur prior to box 206 and/or box 206 may not occur where a transaction is abandoned by a user, a merchant cancels or nullifies the transaction or a portion of the transaction prior to completion, or the like. Thus, in some embodiments, transaction "cancelations" may include different reasons that result in the transaction not being completed or canceled after completion. Resulting from this cancelation, the gold or other reward/value may not be provided to the user and the user may not receive a corresponding item. Thus, at box 210, one or more algorithms and operations may identify the customer and/or other customers who have orders that are canceled by the retailer. This retailer may further be required to report such cancelation in order to prevent electronic transaction processing and/or distribution of reward value, points, or "gold."

At box 212, the service provider's algorithm and/or operations identify participating retailers that also offer the same or similar product. The same or similar product may correspond to a matching product that has the same features, construction, elements, attributes, or the like, which may also include matching item identifiers, descriptions, brands, sellers, or the like. Further, selectable features or parameters of the item, including color, size, quantity, quality, or the like may be required to further be matched from the participating retailers. Retailers may also be selected and/or identified for matching items based on a preferred merchant program or list, such as those that have enrolled in such a program, have a past history of providing sales and/or services that may not be canceled or are otherwise trusted, and/or based on past interactions by the user with such merchants. In this regard, one merchant may cancel a transaction for risk or other purposes but another merchant may approve such a transaction. This may particularly occur with merchants that have previously interacted with and/or have a purchase history with the user, and therefore may trust the user based on previous experiences and interactions.

At box 214, the service provider may charge competitor retailers for priority placement on a follow-up email or notification that informs the user of the availability of the item with such merchants. This may correspond to a listing and/or service that allows for merchants to provide a compensation to the service provider in order to receive premium or higher listing and/or highlighting in a notification of the availability of the item with the other merchants. At box 216, the service provider sends a follow-up email or other communication, including populating an interface using the browser plug-in, of the alternatives and other retailers available for the canceled item and transaction. This may include highlighting and/or providing links to the initial retailer and/or one or more other retailers that make the item available, as well as loading item and/or marketplace data for purchase of the item. At box 218, a customer point and end of customer journey may be completed with the follow-up communication. This allows a customer to further complete canceled transactions and obtain items and rewards.

Figure 3:
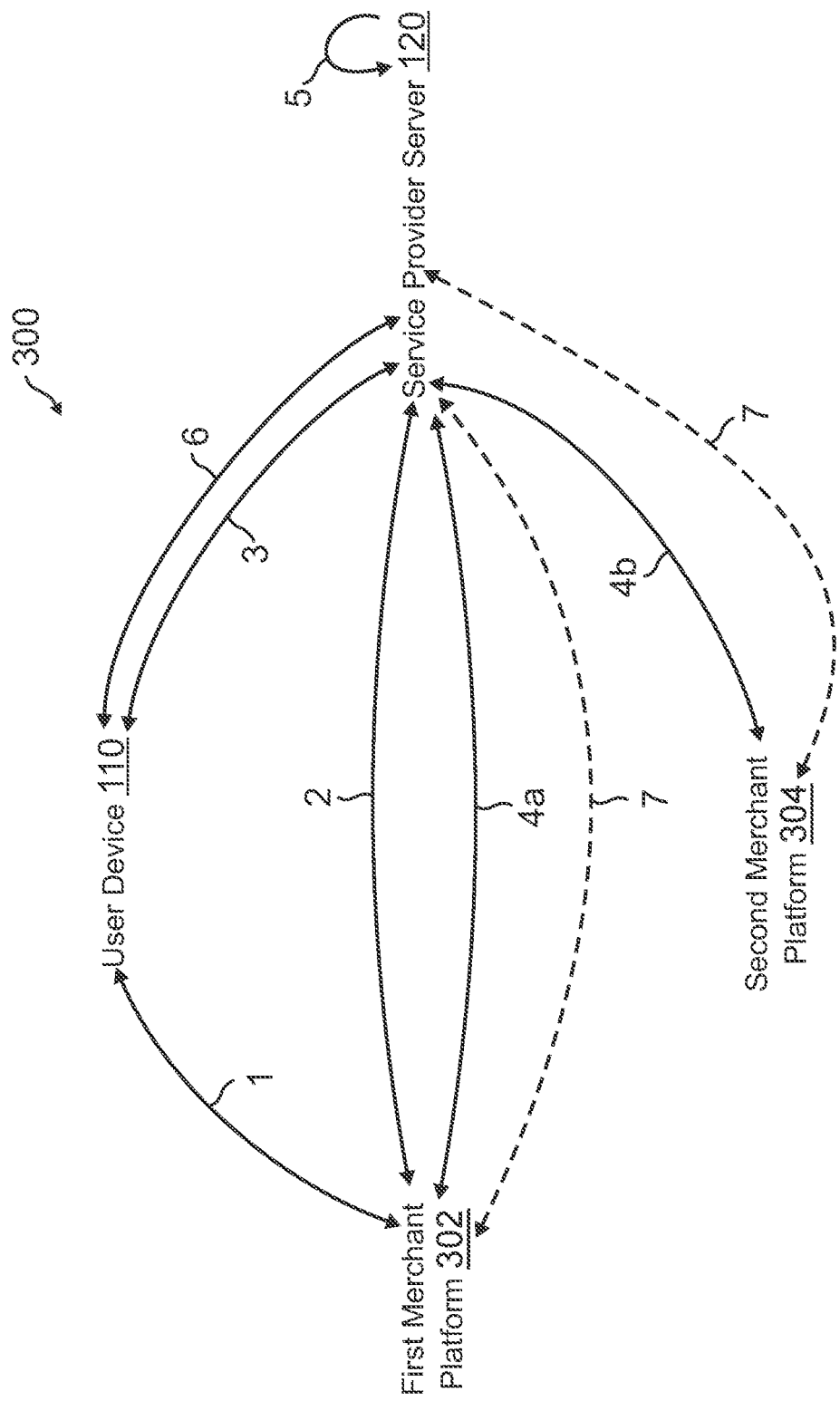
FIG. 3 is an exemplary diagram of system communications when providing matching item data across different online merchant marketplaces, according to an embodiment.

FIG. 3 is an exemplary diagram 300 of system communications when providing matching item data across different online merchant marketplaces, according to an embodiment. Diagram 300 shows interactions between user device 110 and service provider server 120, discussed in reference to system 100 of FIG. 1, which may further interact with a first merchant platform 302 and a second merchant platform 304. In this regard, user device 110 may receive cross-promotional links and data for item purchases that may be performed for canceled transactions based on monitored user navigations and historical browsing data from a software application and/or browser application plug-in provided by service provider server 120. Such operations may be run in real-time or near real-time in a layout agnostic manner by an application on a computing device, such as browsing application 112 on user device 110 in system 100 of FIG. 1.

Initially, user device 110 may perform an interaction 1 with first merchant platform 302, which may include a browsing session of one or more items for electronic transaction processing with first merchant platform 302. This may include browsing and/or searching for items, adding items to a digital shopping cart, initiating and/or providing data (e.g., billing, shipping, financial, or other information), and/or engaging in electronic transaction processing. At interaction 2, first merchant platform 302 may engage with service provider server 120 to perform electronic transaction processing and/or otherwise provide data for monitored browsing and/or item shopping sessions. Such data may include information about potential and/or accrued rewards, value, real or virtual currency, or the like that may be provided for transactions. However, the transaction may be canceled or otherwise ended by the user and/or merchant.

At an interaction 3, user device 110 is informed of the canceled transaction and monitored data from the browsing, shopping, and/or webpage/interface navigation sessions may be processed. This may include service provider server 120 identifying data for the navigation and shopping session, including transaction information for the processed transaction. Using such information, one or more search algorithms and/or operations may be performed in order to search, at interactions 4a and 4b, first merchant platform 302 and second merchant platform 304 for the item, item data, and item features. This may allow for service provider server 120 to obtain and/or extract item data for the item and/or user selection of features from first merchant platform 302, which may then be used to search and determine the same or similar item with matching or available features with second merchant platform 304.

Thereafter, at an interaction 5, service provider server 120 may process the searches, queries, and/or other data for available items with first merchant platform 302, second merchant platform 304, and/or other online merchant marketplaces, websites, and the like. Interaction 5 may include generating one or more alerts, notifications, communications, and/or interface output data that links to the corresponding items with first merchant platform 302 and/or second merchant platform 304 so that a further purchase may be completed for the item(s) and rewards may be accrued and provided by service provider server 120. At an interaction 6, the corresponding notification and data is provided to user device 110, which may be output and/or loaded within one or more user interfaces and/or by one or more applications or application plug-ins. Further, selection of and/or use of weblinks, interface elements or options, and the like may cause automatic navigation to the corresponding item with first merchant platform 302 and/or second merchant platform 304, as well as loading or selection of corresponding features. Such links and/or interface elements may be automatically highlighted or otherwise accented to the user on user device 110. As such, at an interaction 7, user device 110 may be navigated to first merchant platform 302 and/or second merchant platform 304. During interaction 7, additional transactions may be processed and rewards provided in order to remedy the canceled transaction.

Figure 4:
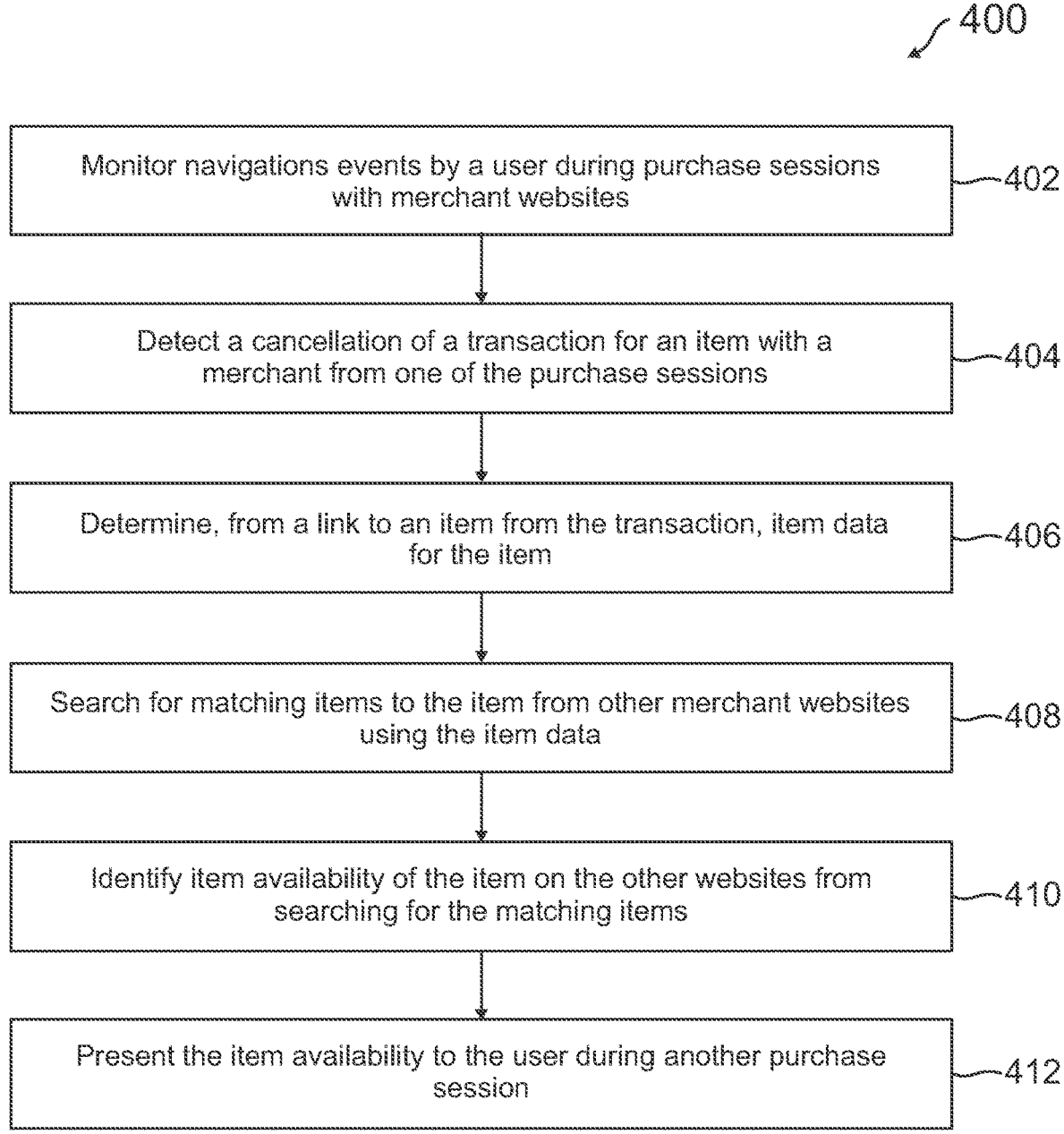
FIG. 4 is a flowchart for browser extensions and applications for cross-platform item data identifications, according to an embodiment.

FIG. 4 is a flowchart 400 for browser extensions and applications for cross-platform item data identifications, according to an embodiment. Note that one or more steps, processes, and methods described herein of flowchart 400 may be omitted, performed in a different sequence, or combined as desired or appropriate.

At step 402 of flowchart 400, navigation events by a user during purchase sessions with merchant websites are monitored. These may be monitored using a device software application and/or add-on, extension, or plug-in for another application including a browser application on a computing device. Monitoring the navigation events may include identifying and/or detecting selected links, visited webpages and/or interfaces, browsed data, item and/or item feature selections, and the like during one or more browsing and/or purchase sessions for online electronic transaction processing. However, the transaction may not be completed and/or processed, and at step 404, a cancellation of a transaction with a merchant is detected from one of the purchase sessions. The service provider monitoring the purchase sessions may determine, using a script, algorithm, or other operation, that the transaction has been ended or canceled by the user and/or the merchant. This may further result in a loss of rewards or other value accrual with the service provider for processing the transaction and/or using the service provider's services.

At step 406, item data for the item in the transaction is determined from a link to an item from the transaction. This may be determined from previous browsing and/or navigation data based on the navigation events, which may include links and/or routing to particular items and/or item features selected by the user in the canceled transaction. For example, the navigation events may include endpoints and/or addresses accessed and/or communicated with by the user's device, which may be used to identify items searched, browsed, and/or selected for purchase by the user. Further, the navigation events may further include inputs and/or selections by the user of item features for the items, which may be used to determine item data for the item specifically selected for the transaction (e.g., item size, color, quantity, quality, etc.).

At step 408, matching items to the item are searched for from other merchant websites using the item data. Using the items identifier, item description, or other item data, different merchant websites and/or online marketplaces may be searched to determine if the same or similar matching item can be located and purchased by the user. This may include identifying whether the item is available with the same or similar features selected by the user. Thus, at step 410, item availability of the item on the other websites is identified from searching for the matching items. This may include determining links and/or navigational data to those items with the other merchant marketplaces. Using such data, at step 412, the item availability is presented to the user during another purchase session. The item availability may be presented via one or more electronic messages and/or application interfaces through the application and/or application extension or plug-in that is installed on the user's device. Further, data for the items and/or availabilities may be automatically loaded and/or navigated to in response to viewing the item availability and/or selecting links to such available items.

Figure 5:
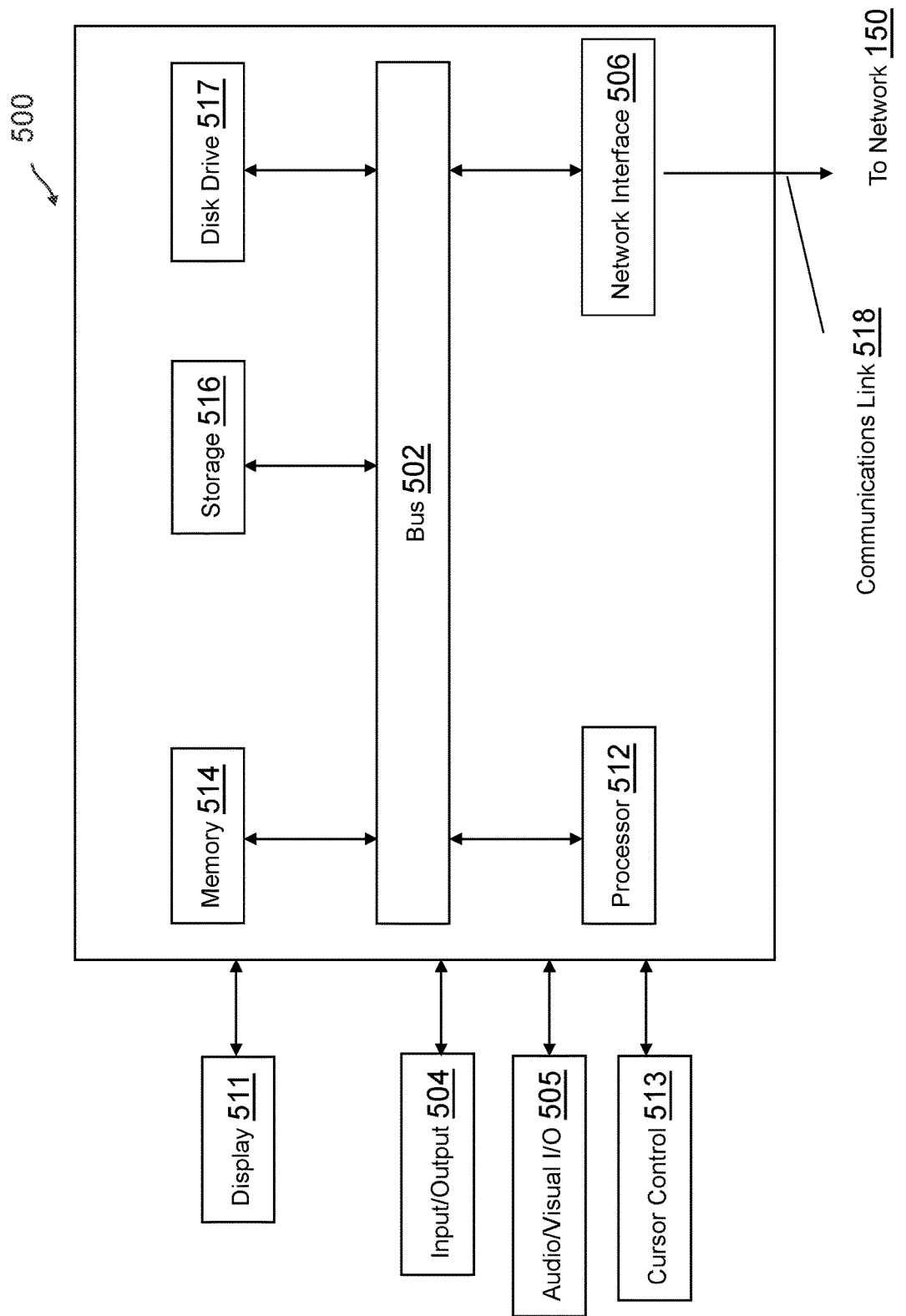
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows:

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
      monitoring, using a service provider application or a service provider browser extension of the service provider system, website navigation data for a first website of a first merchant being viewed on a computing device of a user, wherein the first website comprises an item purchasable by the user having one or more item features selectable by the user;
      detecting, using a coded data package via the service provider browser extension, a cancelation of a transaction for the item with the first merchant being processed via a first link to the transaction on the first website;
      extracting, using the coded data package via the service provider browser extension, transaction data for the transaction at the first link, wherein the transaction data comprises item data and the one or more item features entered to one or more website elements on the first website, and wherein the transaction data is extracted by parsing the one or more website elements using the coded data package for at least one of terms or website element attributes associated with the transaction data;
      determining the item data and the one or more item features selected by the user for the item on the first website based on the transaction data;
      determining an item availability of the item having the one or more item features on a second website of a second merchant, wherein the item availability matches the item on the second website and provides feature availability of the one or more item features on the second website;
      determining a webpage that provides a checkout for the item on the second website, wherein the checkout on the webpage enables a selection of the one or more item features for the item;
      automatically entering the one or more items features in the checkout on the webpage;
      determining a second link to the webpage having the selection of the one or more items features in the checkout; and
      transmitting a notification to the user of the item availability with the second website via the service provider application or the service provider browser extension, wherein the notification comprises the second link.

2. The service provider system of claim 1, wherein the extracting the transaction data is based on a layout of at least one webpage of the first website.

3. The service provider system of claim 1, wherein the one or more item features are associated with at least one of an item title, an item name, an item description, an item option, an item color, an item size, or an item price.

4. The service provider system of claim 1, wherein the operations further comprise:
   detecting a navigation to the webpage of the second website via the service provider application or the service provider browser extension based on a selection of the second link from the notification; and
   causing to be displayed, to the user on the computing device via the service provider application or the service provider browser extension, an interface window having the item with the first website and the second website with the one or more item features selected by the user, wherein the first link to the item on the first website and a third link to the item on the second website are highlighted in the interface window.

5. The service provider system of claim 4, wherein the operations further comprise:
   providing a comparison of the item on the first website to the item on the second website in the interface window.

6. The service provider system of claim 4, wherein the operations further comprise:
   redirecting the navigation via the service provider application or the service provider browser extension to the item on the second website in response to a selection of the third link in the interface window.

7. The service provider system of claim 1, wherein the monitoring the website navigation data is performed during at least one login session of the service provider application or the service provider browser extension and based on the user performing one or more purchases that utilize at least one of a payment tool or a discount service via the service provider application or the service provider browser extension.

8. The service provider system of claim 1, wherein the item availability is further determined based on past transaction activity of the user with a plurality of online merchants and alternatives to upsell the item with the plurality of online merchants.

9. The service provider system of claim 1, wherein the operations further comprise:
determining to promote the second merchant for the item availability based on a preferred merchant service enrolled by the second merchant with the service provider system and a past sales history by the second merchant with a plurality of other users,
wherein the item availability is further determined based on the determining to promote the second merchant.

10. The service provider system of claim 1, wherein the determining the item availability on the second website requires an inventory availability of an item identifier of the item and the inventory availability of at least of one of an item color, an item size, an item quantity, or an item quality, and wherein a price of the item is allowed to be varied between the first website and the second website when determining the item availability on the second website.

11. A method comprising:
receiving navigation data for a device of a user, wherein the navigation data comprises a plurality of links monitored by a web browser plug-in for a web browser on the device during online purchase sessions with a plurality of merchant websites;
detecting, at a first one of the plurality of links, a cancelation of a transaction between the user and a first one of the plurality of merchant websites for an item having selected item features by the user, wherein the cancelation is detected via the web browser plug-in using a coded data package;
extracting, using the coded data package via the web browser plug-in, transaction data for the transaction at the first one of the plurality of links, wherein the transaction data comprises item data and feature data for the selected item features entered to one or more website elements on the first one of the plurality of merchant websites, and wherein the transaction data is extracted by parsing the one or more website elements using the coded data package for at least one of terms or website element attributes associated with the transaction data;
determining the item data for the item and the feature data based at least on the transaction data extracted;
determining an availability of the item with a second one of the plurality of merchant websites, wherein the availability matches the item on the second one of the plurality of merchant websites using the item data and the feature data;
determining a webpage that provides a checkout for the item on the second one of the plurality of merchant websites, wherein the selected item features for the item are automatically selected for the checkout on the webpage based on the feature data;
determining a second one of the plurality of links to the webpage having the checkout for the item with the selected item feature that is processable on the second one of the plurality of merchant websites; and
outputting the second one of the plurality of links to the device via the web browser plug-in.

12. The method of claim 11, wherein the navigation data comprises one or more browsing sessions of the plurality of merchant websites for one or more items further purchasable via the plurality of merchant websites.

13. The method of claim 11, further comprising:
outputting the item offered for sale on the second one of the plurality of merchant websites on the device during a browser session using the web browser plug-in.

14. The method of claim 11, further comprising:
causing, in response to a selection of the second one of the plurality of links on the device, the checkout for the item to be displayed in the web browser.

15. The method of claim 11, wherein the extracting the transaction data comprises identifying at least one of a title, an item identifier, a description, a price, or item features including the selected item feature from at least one of Hypertext Markup Language (HTML) code, Extensible Markup Language (XML) code, or JavaScript code for the first one of the plurality of merchant websites.

16. The method of claim 11, wherein the availability further does not require a price of the item to be matched between the first one and the second one of the plurality of merchant websites.

17. A non-transitory machine-readable medium having stored thereon machine-readable instructions executable to cause a machine to perform operations comprising:
detecting a cancelation with a merchant of a transaction between a user and the merchant for an item purchased by the user on a first online marketplace platform associated with the merchant based on monitored website data from a web browser plug-in installed with a web browser on a device of the user, wherein the cancelation is detected using a coded data package associated with the web browser plug-in and the first online marketplace platform;
extracting, using the coded data package via the web browser plug-in, transaction data for the transaction on the first online marketplace platform, wherein the transaction data is entered to a one or more webpage elements of the first online marketplace platform, and wherein the transaction data is extracted by parsing the one or more webpage elements using the coded data package for at least one of terms or webpage element attributes associated with the transaction data;
determining item data for the item on the first online marketplace platform based on the transaction data, wherein the item data comprises at least one item feature of the item that is selected by the user for the transaction;
determining that the item is available on a second online marketplace platform of a second merchant having one or more matching item features of the item in the transaction;
determining a webpage that provides a checkout for the item on the second online marketplace platform, wherein the checkout on the webpage includes the one or more matching item features for the item;
determining a link to the webpage having the one or more matching items features in the checkout; and
notifying, using the web browser plug-in, the user of the item available on the second online marketplace platform during a web browser session using the web browser on the device.

18. The non-transitory machine-readable medium of claim 17, wherein the item is a first item and the transaction includes a second item, and wherein the operations further comprise:
determining that the second item is available on the second online marketplace platform,
wherein the user is further notified that the second item is available on the second online marketplace platform.

19. The non-transitory machine-readable medium of claim 17, wherein the cancelation is caused by one of the user or the merchant stopping the transaction prior to a completion of processing the transaction with an online payment provider system.

20. The non-transitory machine-readable medium of claim 17, wherein the operations further comprise:
   causing a navigation of the web browser to the second online marketplace platform using the web browser plug-in.

\* \* \* \* \*